(12) United States Patent
Heitzman (10) Patent No.: US 9,021,592 B2
(45) Date of Patent: Apr. 28, 2015

(54) SOURCE CODE ANALYSIS OF INTER-RELATED CODE BASES

(75) Inventor: Eric H. Heitzman, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 43 days.

(21) Appl. No.: 13/547,797

(22) Filed: Jul. 12, 2012

(65) Prior Publication Data

US 2014/0020046 A1 Jan. 16, 2014

(51) Int. Cl.
*H04L 29/06* (2006.01)
*G06F 21/56* (2013.01)
*G06F 21/57* (2013.01)

(52) U.S. Cl.
CPC .......... *G06F 21/563* (2013.01); *H04L 63/1433* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 6,735,703 B1 * | 5/2004 | Kilpatrick et al. | 726/23 |
| 7,340,726 B1 | 3/2008 | Chelf et al. | |
| 7,418,734 B2 * | 8/2008 | Berg et al. | 726/25 |
| 7,526,758 B2 | 4/2009 | Hasse et al. | |
| 2007/0006170 A1 | 1/2007 | Hasse et al. | |
| 2008/0276228 A1 | 11/2008 | Sreedhar | |
| 2010/0275186 A1 | 10/2010 | McGarvey et al. | |
| 2011/0154120 A1 | 6/2011 | Kim et al. | |
| 2012/0023553 A1 | 1/2012 | Berg et al. | |

* cited by examiner

*Primary Examiner* — Gilberto Barron, Jr.
*Assistant Examiner* — Simon Kanaan
(74) *Attorney, Agent, or Firm* — Yee & Associates, P.C.; Parashos T. Kalaitzis (57) ABSTRACT

A method and system for analyzing source code is disclosed. A computer identifies a call in a first source code to an application programming interface in a second source code. Responsive to identifying the call in the first source code to the application programming interface in the second source code, the computer determines whether a set of policies for calls to application programming interfaces includes a policy for calls to the application programming interface. Responsive to a determination that the set of policies for calls to application programming interfaces does not include the policy for calls to the application programming interface, the computer generates the policy for calls to the application programming interface and adds the generated policy to the set of policies for calls to application programming interfaces.

21 Claims, 6 Drawing Sheets

FIG. 1

```
                        SOURCE CODE          200

APPLICATION SOURCE CODE   202

Function setParameters(string employeeName)  ─ 208      206
 {
     boolean verifiedName = TRUE;  ─ 210        212
     if(applicationNameVerificationEnabled()) verifiedName = verifyEmployeeName(employeeName);
     if(verifiedName) setEmployeeName(employeeName);  ─ 214
     else reportAsInvalid(employeeName);  ─ 216
 };

LIBRARY SOURCE CODE     204

Function setEmployeeName(string employeeName)  ─ 220    207
 {
     boolean verifiedName = TRUE;  ─ 222        224
     if(libraryNameVerificationEnabled()) verifiedName = verifyEmployeeName(employeeName);
     if(verifiedName)  ─ 226
     {
         string sqlStatement = generateSqlStatement(employeeName);  ─ 228
         executeSqlStatement(sqlStatement);  ─ 230
     };
         else reportAsInvalid(employeeName);  ─ 232
 };
```

SOURCE CODE ANALYSIS OF INTER-RELATED CODE BASES

BACKGROUND

1. Field

The disclosure relates generally to analyzing source code and in particular, to managing policies for calls in the source code. Still more particularly, the present disclosure relates to a method, system, and computer program product for managing a policy for a call in a first source code to a function in a second source code based on information from a trace of the second source code.

2. Description of the Related Art

Data processing systems provide computing resources, such as a computer, that includes a central processing unit and computer memory. Executable programs are executed by the central processing unit in the computer using the computer memory. The executable programs store and use data in the form of data structures located in the computer memory. During execution of the executable programs the information in these data structures may become corrupted by unforeseen errors in the executable programs and also by unforeseen malevolent uses of the executable programs Responsive to the corruption of a data structure, a subsequent error is likely to occur at unexpected points of execution in the program. Further, in the case of an unforeseen malevolent use of an executable program, the unforeseen malevolent use may result in critical security issues.

Static analysis of source code vulnerabilities is a process for assessing risk for vulnerabilities of executable programs by analyzing the source code or compiled form of the executable program. One technique within the field of static analysis includes a process for identifying potentially malicious data entering a program, then determining where the data flows within the program for the purpose of identifying security vulnerabilities. This process for identifying security vulnerabilities using static analysis is called data flow analysis. Data flow analysis tools use parsers to generate a data flow graph of the program being analyzed. Data flow analysis tools also use pre-defined application programming interface (API) policies that identify the expected behavior of each application programming interface utilized by the program being analyzed as well as potential vulnerabilities. Data flow analysis tools traverse the generated graph of an application to identify instances where potentially malicious data may reach an application programming interface that has been identified as vulnerable to malicious data. However, gaps may exist in the number of application programming interfaces for which a policy exists identifying the expected behavior. For example, all of the application programming interfaces that are in use by external applications may not be known when a data flow analysis tool runs. Further, a data flow analysis tool may only be able to create a partial graph of the data flows of an application due to not having access to all of the source code used by application programming interfaces of the application.

Therefore, it would be advantageous to have a method, apparatus, and computer program product that takes into account at least some of the issues discussed above, as well as possibly other issues.

SUMMARY

In one illustrative embodiment, a method, data processing system, and computer program product for analyzing source code is provided. A data processing system identifies a call in a first source code to an application programming interface in a second source code. Responsive to identifying the call in the first source code to the application programming interface in the second source code, the data processing system determines whether a set of policies for calls to application programming interfaces includes a policy for calls to the application programming interface. Responsive to a determination that the set of policies for calls to application programming interfaces does not include the policy for calls to the application programming interface, the data processing system generates the policy for calls to the application programming interface and adds the generated policy to the set of policies for calls to application programming interfaces.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute on one or more computers. For example, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account that existing data flow analysis tools are available for analyzing source code. In particular, these data flow analysis tools parse the source code and identify traces of possible data flows in the source code. More particularly, these data flow analysis tools analyze the traces of possible data flows in the source code for possible malicious acts.

Figure 1:
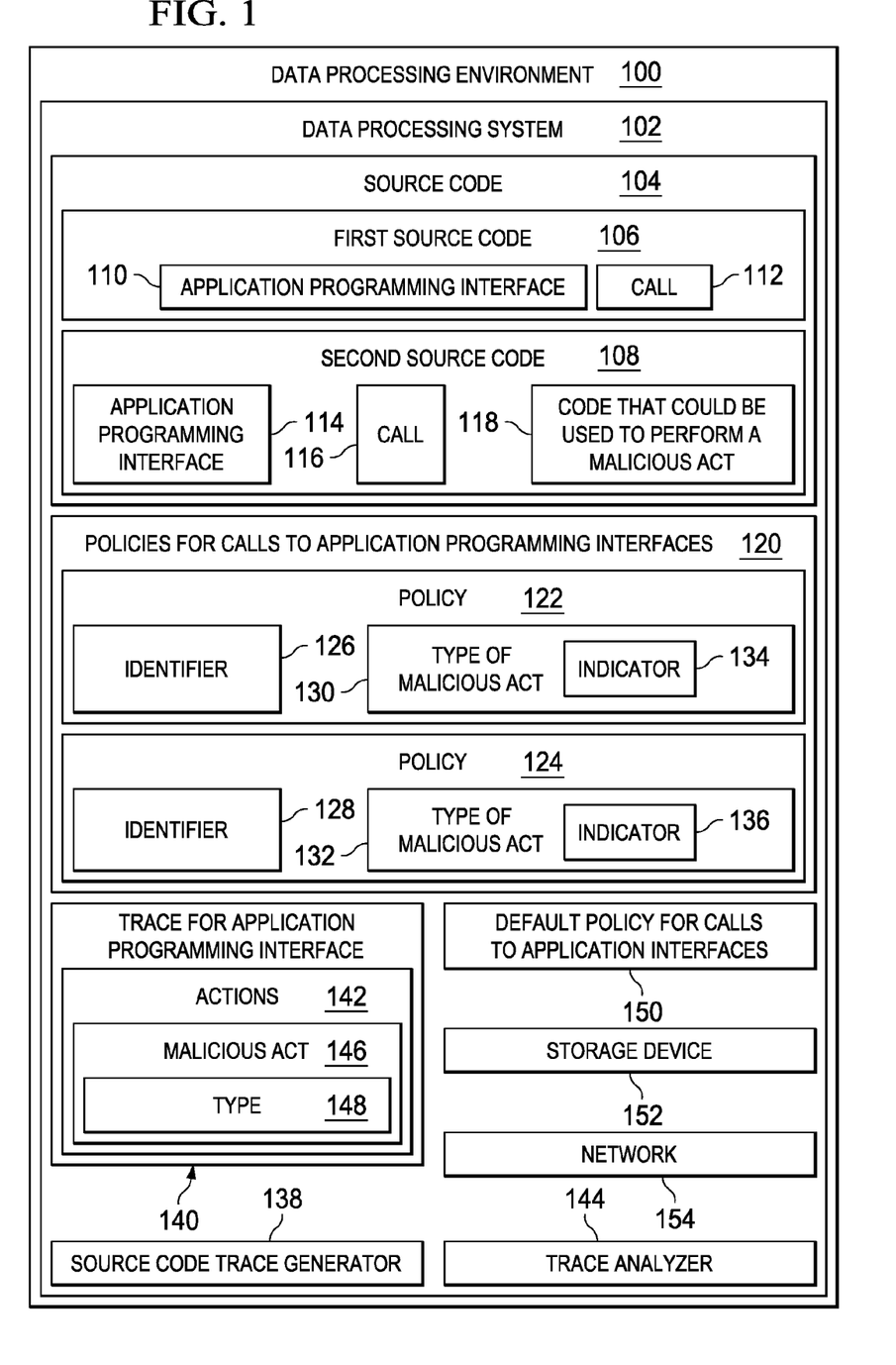
FIG. 1 is a block diagram of components involved in analyzing source code in a data processing environment in accordance with an illustrative embodiment.

With reference now to the figures and, in particular, with reference to FIG. 1, an illustration of components involved in analyzing source code in a data processing environment is depicted in accordance with an illustrative embodiment. In this illustrative example, data processing system 102 is present in data processing environment 100. Data processing system 102 may comprise a set of computers. A "set," as used herein with reference to items, means one or more items. For example, "set of computers" is one or more computers. When more than one computer is present in data processing system 102, those computers may be in communication with each other. This communication may be facilitated through a medium such as a network. This network may be, for example, without limitation, a local area network, a wide area network, an intranet, the internet, and some other suitable type of network.

In these illustrative examples, source code 104 may be located in data processing system 102. Source code 104 may comprise a number of source code modules, such as first source code 106 and second source code 108. Code written in source code modules in source code 104 may be written in any programming language suitable for execution on data processing systems such as data processing system 102. For example, a programming language for code in source code 104 may define syntax for creating data structures and calling functions in source code 104. The syntax used to define data structures and call functions may vary significantly between different programming languages. For example, some object oriented programming languages may use classes that comprise data and functions instead of defining data structures and classes separately as does other programming languages.

As depicted, source code 104 comprises first source code 106 and may also comprise second source code 108. In these illustrative examples, first source code 106 and second source code 108 may or may not be present during a process for analyzing source code. For example, first source code 106 may be source code of an application, second source code 108 may be source code of a library used by first source code 106. In these illustrative examples, first source code 106 comprises application programming interface 110 which makes calls to other application programming interfaces. For example, call 112 in first source code 106 may be a call to application programming interface 114 in second source code 108. As depicted, subsequent to a call to application programming interface 114 in second source code 108, application programming interface may also make calls to other application programming interfaces and execute code that may be used to perform a malicious act. For example, call 116 in second source code 108 may be a call to another interface in second source code 108 that comprises code that could be used to perform a malicious act 118. In this example, code that could be used to perform a malicious act 118 may include management of a customer account or any other act that could be malicious if done improperly, such as by using inaccurate or malicious data.

In these illustrative examples, policies for calls to application programming interfaces 120 may include first policy 122 for application programming interface 110 and also may include second policy 124 for application programming interface 114. However, in a process for analyzing source code 104, policy 122 and policy 124 may not exist when the process starts. For example, policies for calls to application programming interfaces 120 may have gaps where one or more application programming interfaces does not have a policy. As depicted, policy 122 includes identifier 126 of the application programming interfaces for which policy 122 applies, and policy 124 includes identifier 128 of the application programming interfaces for which policy 124 applies. Identifier 126 may point to application programming interface 110 and identifier 128 may point to application programming interface 114. As also depicted, policy 122 includes type of malicious act 130 that may be performed if indicator 134 is set and policy 124 includes type of malicious act 132 that may be performed if indicator 136 is set. Responsive to a determination that the application programming interface identified by identifier 126 may be used to perform type of malicious act 130, indicator 134 may be set. As another example, responsive to a determination that the application programming interface identified by identifier 126 may not be used to perform type of malicious act 130, indicator 134 may be unset. In these illustrative examples, setting an indicator such as indicator 134 and indicator 136 is an indication that the type of malicious act for which they refer may occur. In these illustrative examples, unsetting an indicator such as indicator 134 and indicator 136 is an indication that the type of malicious act for which they refer may not occur.

Source code trace generator 138 is present in data processing system 102 and may be used in a process to generate a data flow graph of source code 104, such as trace for application programming interface 140. As depicted, trace for application programming interface 140 generated by source code trace generator 138 may include actions 142 that are taken by taken by source code 104, such as actions taken by first source code 106 and actions that are taken by second source code 108. For example, actions 142 may include call 112 in application programming interface 110, call 116 in application programming interface 114, and a use of code that could be used to perform a malicious act 118. In the case of use of code that could be used to perform a malicious act 118 actions 142 may include malicious act 146 of type 148. For example, type 148 for malicious act 146 may be a call to an application programming interface having a policy that indicates the application programming interface may be used to perform a malicious act. Type 148 may also be a type of malicious act performed by code found in a traced application programming interface such as a possibly inappropriate use of data processing system 102 by un-validated data. For example, un-validated data may be data that has been identified in the trace as being passed from application programming interface 110 to application programming interface 114.

Trace analyzer 144 is also present in data processing system 102 and may be used in processes for analyzing trace for application programming interface 140. For example, trace analyzer 144 may be used in a process to generate policies for gaps in policies for calls to application programming interfaces 120. In this example, trace analyzer may identify a use of application programming interface 114 by an action in actions 142 that includes call 112 to application programming interface 114 by application programming interface 110. Further in this example, subsequent to the identification of the use, trace analyzer 144 may then identify if there is a policy in policies for calls to application programming interfaces 120. Still further in this example, if there is no policy for application programming interface 114 trace analyzer 144 may generate policy 124 for application programming interface 114 using default policy for calls to application interfaces 150. In these illustrative examples, default policy for calls to application interfaces 150 may include one or more types of malicious acts and indicators for the one or more types of malicious acts identifying whether the default for each type of malicious act is set or unset by default.

Trace analyzer 144 may also be used in a process to manage policies for application programming interfaces such as policy 122 and policy 124. For example, in a first analysis of first source code 106 by trace analyzer 144, policy 122 for application programming interface 110 may comprise indicator 134 as being set indicating that type of malicious act 130 may exist. In this example, second source code 108 was not available during the first analysis. Responsive to the unavailability, default policy for calls to application interfaces 150 is used by the process to set indicator 136. Subsequent to setting indicator 136, the process then set indicator 134 for policy 122 for application programming interface 110 based on the action in actions 142 indicating that that application programming interface 110 calls application programming interface 114. Further in this example, subsequent to a second analysis by trace analyzer 144 that includes an indication that indicator 136 should be unset, trace analyzer may then unset indicator 134. For example, during the second analysis a selection by a user may have manually unset indicator 136 or second source code 108 may have been made available for source code trace generator 138 and trace analyzer 144 during the second analysis. Another example of a reason to unset and indicator that a type of malicious act has occurred, is the identification of an action in actions 142 that verifies data passed to the application programming interface.

As depicted, type of malicious act 130 and type of malicious act 132 may include a use of devices such as storage device 152, network 154, memory or processor use in data processing system 102, and any other malicious act that may be performed by source code 104. For example, without limitation, type of malicious act 130 may be an un-authorized use of a resource; an un-authorized deletion, copying, or modification of a data structure in memory; and an un-authorized sending of messages over a network.

The illustration of data processing environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example data processing system 102 may include use of local area network (LAN), a wide area network (WAN), an intranet, the Internet, or some combination thereof. In this example, an analysis of source code 104 may combine another analysis by trace analyzer 144 from another data processing system.

Figure 2:
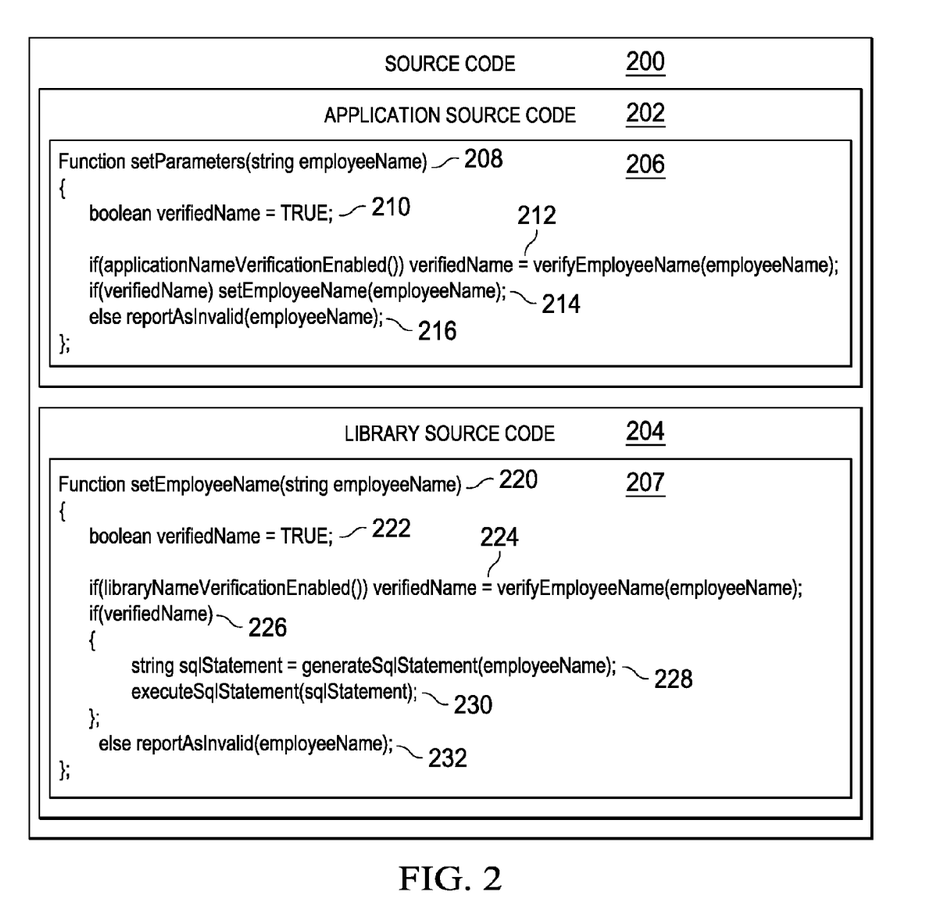
FIG. 2 is an illustration of an example of source code analyzed by a source code analysis process in accordance with an illustrative embodiment.

Turning next to FIG. 2, an illustrative example of source code analyzed by a source code analysis process is depicted in accordance with an illustrative embodiment. Source code 200 is an example of source code 104 in FIG. 1. In particular, application source code 202 is an example of first source code 106 in FIG. 1 and library source code 204 is an example of second source code 108 in FIG. 1. More particularly, function setParameters( ) 206 is an example of application programming interface 110 in FIG. 1. Still more particularly, function setEmployeeName( ) 207 is an example of application programming interface 114 in FIG. 1.

In this illustrative example, program statements 208-216 are present in function setParameters( ) 206. As depicted program statement 208 is for receiving a string called employeeName. As also depicted, program statement 210 creates boolean variable verifiedName and sets verifiedName to true. As further depicted, program statement 212 calls function applicationNameVerificationEnabled( ) which subsequently returns a result used to determine if function setParameters( ) 206 should verify employeeName, and if so, use function verifyEmplyeeName( ) to verify employeeName. Responsive to the result of the verification of employeeName by function verifyEmployeeName( ) boolean verifiedName is then set or unset using the result to indicate the validity of employeeName. As still further depicted, program statement 214 uses boolean verifiedName to determine if function setParameters( ) 206 should call function setEmployeeName( ) 207 or call function reportAsInvalid( ).

In this illustrative example, program statements 220-232 are present in function setEmployeeName( ) 207. As depicted program statement 220 is for receiving a string called employeeName. As also depicted, program statement 222 creates boolean variable verifiedName and sets verifiedName to true. As further depicted, program statement 224 calls function libraryNameVerificationEnabled( ) which subsequently returns a result used to determine if function setEmployeeName( ) 207 should verify employeeName, and if so, use function verifyEmplyeeName( ) to verify employeeName. Responsive to the result of the verification of employeeName by function verifyEmployeeName( ) boolean verifiedName is then set or unset using the result to indicate the validity of employeeName. As still further depicted, program statement 226 uses boolean verifiedName to determine if function setEmployeeName( ) 207 should perform program statements 228 and 230 or program statement 232 for calling function reportAsInvalid( ). Responsive to verifiedName being set function setEmployeeName( ) 207 performs program statement 228 and program statement 230 to generate string sqlStatement using function generateSqlStatement ( ) and then calls function executeSqlStatement( ) to make a request by a database to perform generated sqlStatement. For example, generated sqlStatement may be a structured query language (SQL) statement for placing employeeName in a database.

As depicted, program statements 208-216 in function setParameters( ) 206 and program statements 220-232 in function setEmployeeName( ) 207 may be used by source code trace generator 138 in FIG. 1 to create trace for application programming interface 140 in FIG. 1. As also depicted, the actions taken by program statements 220-232 and 220-232 may be used by trace analyzer 144 in FIG. 1 to manage policies for calls to application programming interfaces 120 in FIG. 1.

Figure 3:
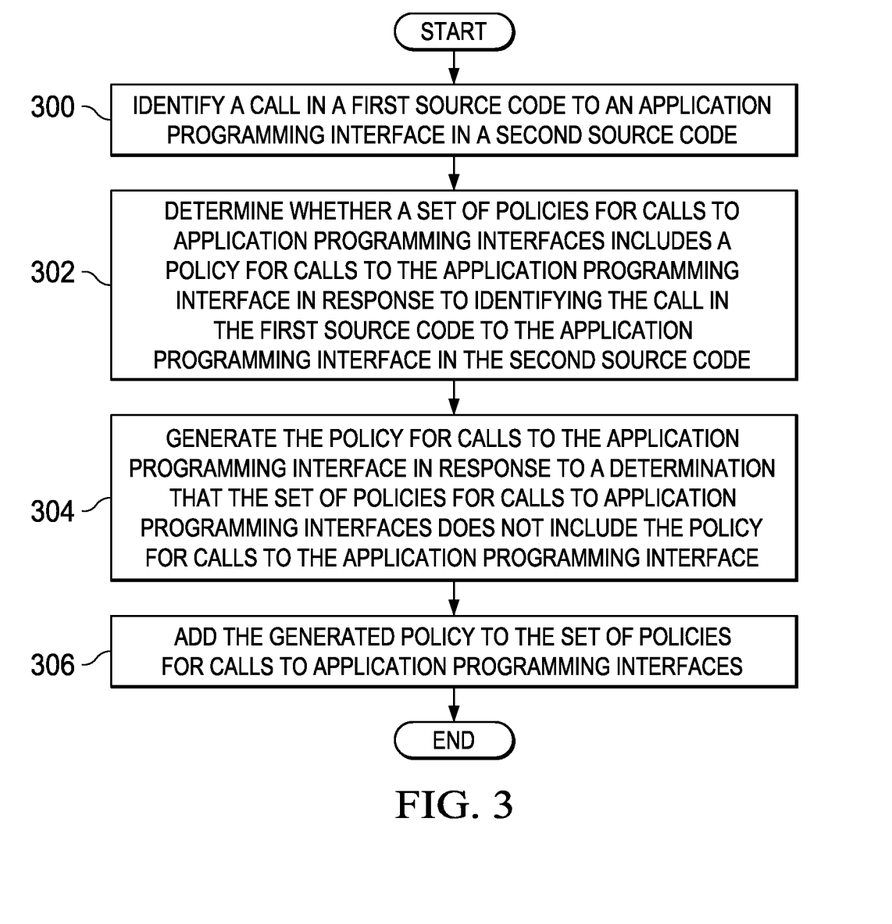
FIG. 3 is a flow chart of a process for generating a policy for calls to an application programming interface in accordance with an illustrative embodiment.

With reference now to FIG. 3, an illustrative example of a flowchart of a process for generating a policy for calls to an application programming interface is depicted in accordance with an illustrative embodiment. The steps in FIG. 3 may be implemented in data processing environment 100 in FIG. 1. In particular, the steps may be implemented in software, hardware, or a combination of the two in data processing system 102 in FIG. 1 by source code trace generator 138 in FIG. 1 and by trace analyzer 140 in FIG. 1.

The process begins by identify a call in a first source code to an application programming interface in a second source code (step 300). For example, the process may identify call 112 in FIG. 1 in first source code 106 in FIG. 1 to application programming interface 114 in FIG. 1 in second source code 108 in FIG. 1. In this illustrative example, responsive to the process identifying the call in the first source code to the application programming interface in the second source code, the process then determines whether a set of policies for calls to application programming interfaces includes a policy for calls to the application programming interface in (step 302). For example, the process may search through policies for calls to application programming interfaces 120 in FIG. 1 for a policy associated with application programming interface 114, such as policy 122 in FIG. 1 or policy 124 in FIG. 1.

As depicted, in response to a determination by the process that the set of policies for calls to application programming interfaces does not include the policy for calls to the application programming interface, the process then generates the policy for calls to the application programming interface (step 304). As also depicted, the process then adds the generated policy to the set of policies for calls to application programming interfaces (step 306) with the process terminating thereafter.

Figure 4:
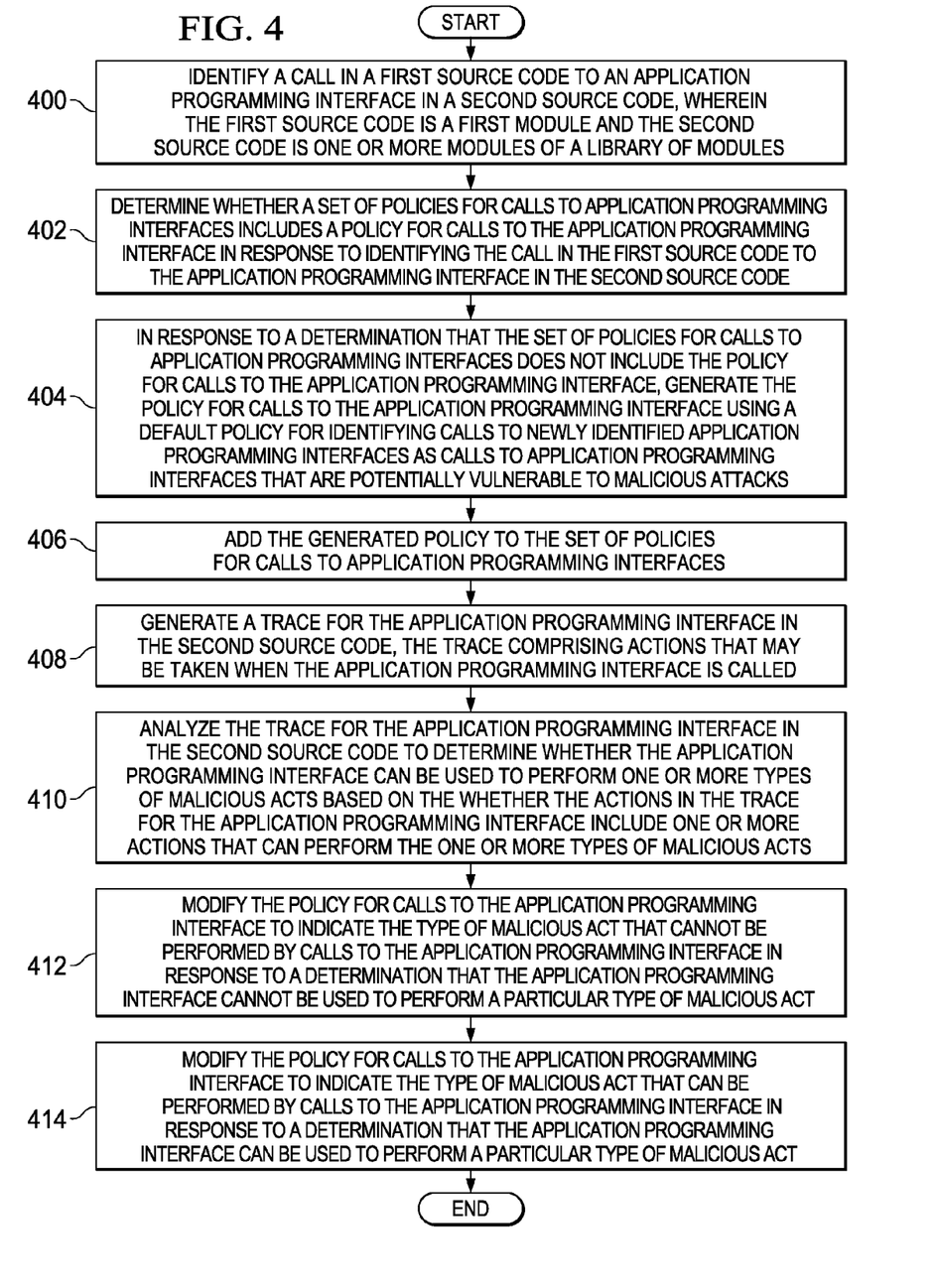
FIG. 4 is a flow chart of a process for managing a policy for calls to an application programming interface according to an analysis of the source code in the application programming interface in accordance with an illustrative embodiment.

With reference now to FIG. 4, an illustrative example of a flowchart of a process for managing a policy for calls to an application programming interface according to an analysis of the source code in the application programming interface is depicted in accordance with an illustrative embodiment. The steps in FIG. 4 may be implemented in data processing environment 100 in FIG. 1. In particular, the steps may be implemented in software, hardware, or a combination of the two in data processing system 102 in FIG. 1 by source code trace generator 138 in FIG. 1 and by trace analyzer 140 in FIG. 1.

The process begins by identify a call in a first source code to an application programming interface in a second source code, wherein the first source code is a first module and the second source code is one or more modules of a library of modules (step 400). The process next determines whether a set of policies for calls to application programming interfaces includes a policy for calls to the application programming interface in response to identifying the call in the first source code to the application programming interface in the second source code (step 402). In response to a determination that the set of policies for calls to application programming interfaces does not include the policy for calls to the application programming interface, the process generates the policy for calls to the application programming interface using a default policy for identifying calls to newly identified application programming interfaces as calls to application programming interfaces that are potentially vulnerable to malicious attacks (step 404). The process then adds the generated policy to the set of policies for calls to application programming interfaces (step 406).

As depicted, the process also generates a trace for the application programming interface in the second source code, wherein the trace comprises actions that may be taken when the application programming interface is called (step 408). The process analyzes the trace for the application programming interface in the second source code to determine whether the application programming interface can be used to perform one or more types of malicious acts based on the whether the actions in the trace for the application programming interface include one or more actions that can perform the one or more types of malicious acts (step 410).

In this illustrative example, responsive to a determination that the application programming interface cannot be used to perform a particular type of malicious act, the process modifies the policy for calls to the application programming interface to indicate the type of malicious act that cannot be performed by calls to the application programming interface (step 412). Further in this illustrative example, responsive to a determination that the application programming interface can be used to perform the particular type of malicious act, the process modifies the policy for calls to the application programming interface to indicate the type of malicious act that can be performed by calls to the application programming interface (step 414) with the process terminating thereafter.

Figure 5:
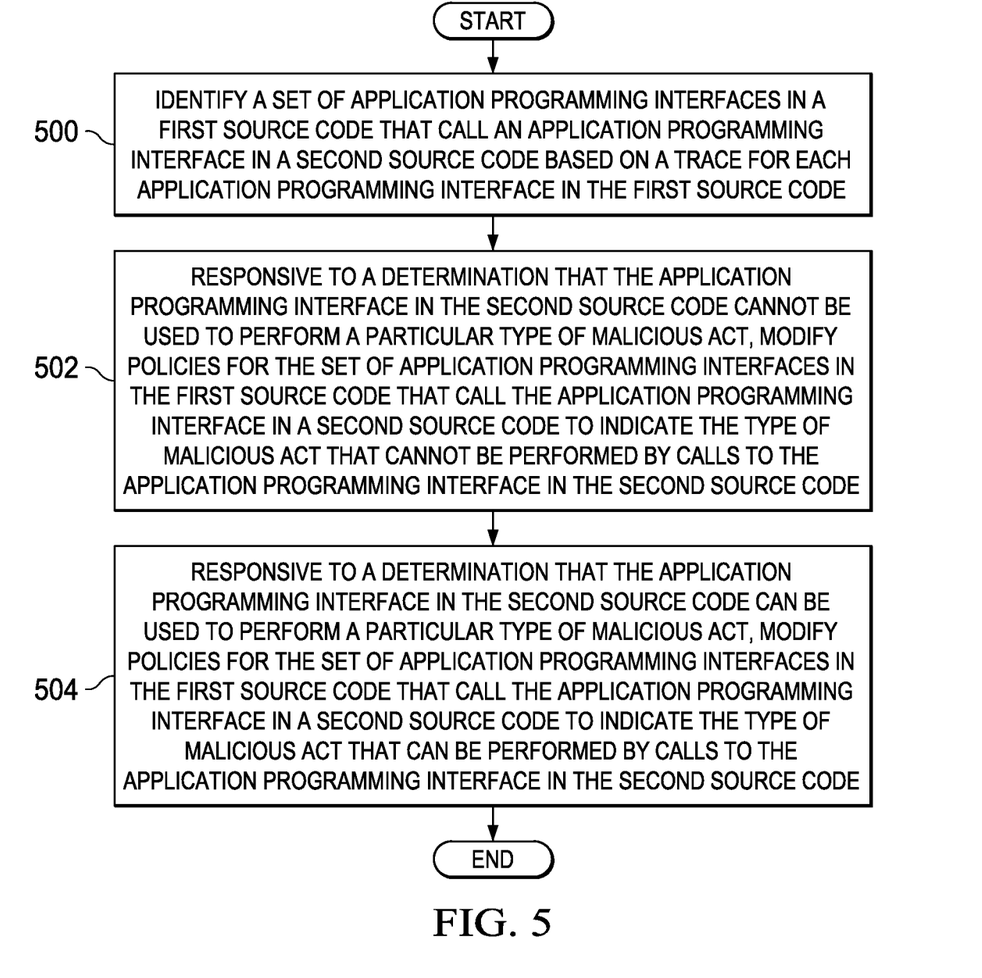
FIG. 5 is a flow chart of a process for managing policies for a set of calls to an application programming interface according to an analysis of the source code in the application programming interface in accordance with an illustrative embodiment.

With reference now to FIG. 5, an illustrative example of a flowchart of a process for managing policies for a set of calls to an application programming interface according to an analysis of the source code in the application programming interface is depicted in accordance with an illustrative embodiment. The steps in FIG. 5 may be implemented in data processing environment 100 in FIG. 1. In particular, the steps may be implemented in software, hardware, or a combination of the two in data processing system 102 in FIG. 1 by source code trace generator 138 in FIG. 1 and by trace analyzer 140 in FIG. 1.

The process begins by identifying a set of application programming interfaces in a first source code that call an application programming interface in a second source code based on a trace for each application programming interface in the first source code (step 500). As depicted, responsive to a determination that the application programming interface in the second source code cannot be used to perform a particular type of malicious act, the process modifies policies for the set of application programming interfaces in the first source code that call the application programming interface in a second source code to indicate the type of malicious act that cannot be performed by calls to the application programming interface in the second source code (step 502).

In this illustrative example, responsive to a determination that the application programming interface in the second source code can be used to perform the particular type of malicious act, the process modifies policies for the set of application programming interfaces in the first source code that call the application programming interface in a second source code to indicate the type of malicious act that can be performed by calls to the application programming interface in the second source code (step 512) with the process terminating thereafter.

Figure 6:
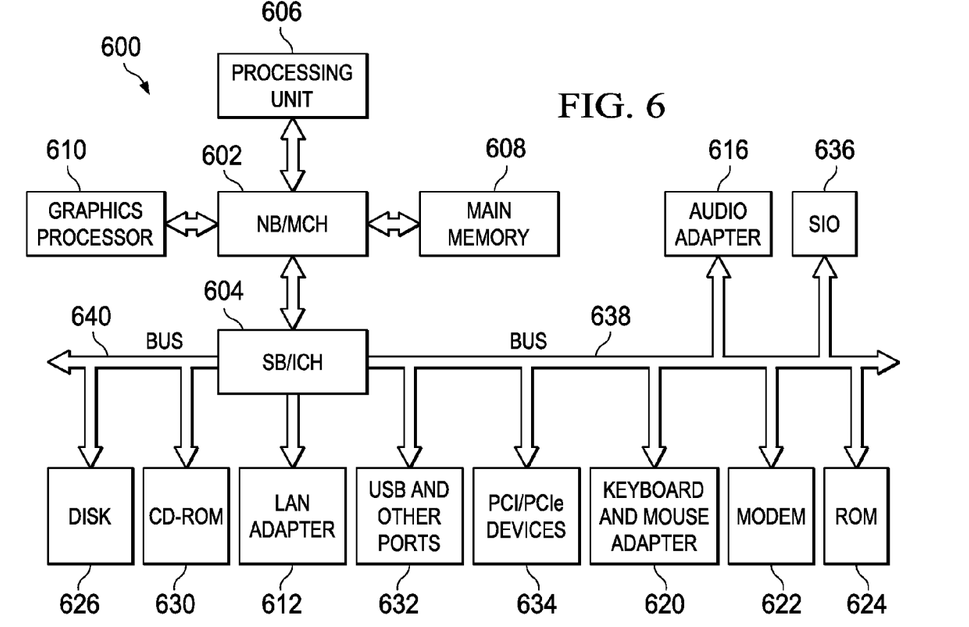
FIG. 6 is an illustration of a data processing system in accordance with an illustrative embodiment.

Referring to FIG. 6, a block diagram of a computer or data processing system is shown in which aspects of the present invention may be implemented. This system is an example of a computer which may be used to implement components of FIG. 1, such as source code trace generator 138, trace analyzer 140, and data processing system 102, and in which computer usable code or instructions implementing the processes for embodiments of the present invention may be located.

In the depicted example, the data processing system of FIG. 6 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, disk 626, CD-ROM 630, universal serial bus (USB) ports and other communication ports 632, and PCI/PCIe devices 634 connect to SB/ICH 604 through bus 638 and bus 640. PCI/PCIe devices 634 may include, for example, Ethernet adapters, add-in cards, and PC cards for notebook computers. PCI uses a card bus controller, while PCIe does not. ROM 624 may be, for example, a flash binary input/output system (BIOS).

Disk 626 and CD-ROM 630 connect to SB/ICH 604 through bus 640. Disk 626 and CD-ROM 630 may use, for example, an integrated drive electronics (IDE) or serial advanced technology attachment (SATA) interface. Super I/O (SIO) device 636 may be connected to SB/ICH 604.

An operating system runs on processing unit 606 and coordinates and provides control of various components within the data processing system of FIG. 6. As a client, the operating system may be a commercially available operating system such as Microsoft® Windows® (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on the data processing system (Java is a trademark of Sun Microsystems, Inc. in the United States, other countries, or both).

As a server, the data processing system of FIG. 6 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). The data processing system may be a symmetric multiprocessor (SMP) system including a plurality of processors in processing unit 606. Alternatively, a single processor system may be employed.

Instructions for the operating system, the object-oriented programming system, and applications or programs are located on storage devices, such as disk 626, and may be loaded into main memory 608 for execution by processing unit 606. The processes for embodiments of the present invention are performed by processing unit 606 using computer usable program code, which may be located in a memory such as, for example, main memory 608, ROM 624, or in one or more peripheral devices, such as, for example, disk 626 and CD-ROM 630.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for managing policies for calls in a first source code to a function in a second source code based on information from a trace of the second source code.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for analyzing source code, the method comprising:
   identifying, by a computer, a call in a first source code to an application programming interface in a second source code, wherein the first code comprises one or more program statements in an application source code and the second source code comprises one or more program statements in at least one of a library source code and an application source code;
   responsive to identifying the call in the first source code to the application programming interface in the second source code, determining, by the computer, whether a set of policies for calls to application programming interfaces includes a policy for calls to the application programming interface identified, wherein the policy includes an identifier of the application programming interfaces for which the policy applies, an indicator and a type of malicious act which is performed when the indicator is set; and
   responsive to a determination that the set of policies for calls to application programming interfaces does not include the policy for calls to the application programming interface identified, the computer generating the policy for calls to the application programming interface identified and adding the generated policy to the set of policies for calls to application programming interfaces.

2. The method of claim 1, further comprising:
   generating, by the computer, a trace for the application programming interface in the second source code, the trace comprising actions that may be taken when the application programming interface identified is called; and
   analyzing, by the computer, the trace for the application programming interface in the second source code to determine whether the application programming interface identified can be used to perform one or more types of malicious acts based on the whether the actions in the trace for the application programming interface identified include one or more actions that can perform the one or more types of malicious acts.

3. The method of claim 2, further comprising:
   responsive to a determination that the application programming interface identified cannot be used to perform a particular type of malicious act, modifying, by the computer, the policy for calls to the application programming interface identified to indicate the type of malicious act that cannot be performed by calls to the application programming interface identified; and
   responsive to a determination that the application programming interface identified can be used to perform the particular type of malicious act, modifying, by the computer, the policy for calls to the application programming interface identified to indicate the type of malicious act that can be performed by calls to the application programming interface identified.

4. The method of claim 3, further comprising:
   identifying, by the computer, a set of application programming interfaces in the first source code that call the application programming interface in the second source code;
   responsive to the determination that the application programming interface in the second source code cannot be used to perform the particular type of malicious act, modifying, by the computer, each policy for calls to each application programming interface in the set of application programming interfaces in the first source code that call the application programming interface in the second source code to indicate the type of malicious act that cannot be performed by calls to the application programming interface in the second source code; and
   responsive to the determination that the application programming interface in the second source code can be used to perform the particular type of malicious act, modifying, by the computer, each policy for calls to each application programming interface in the set of application programming interfaces in the first source code that call the application programming interface in the second source code to indicate the type of malicious act that can be performed by calls to the application programming interface in the second source code.

5. The method of claim 1, wherein generating, by the computer, the policy for calls to the application programming interface identified comprises using a default policy for identifying calls to newly identified application programming interfaces as calls to application programming interfaces that are potentially vulnerable to malicious attacks.

6. The method of claim 4, wherein identifying, by the computer, the set of application programming interfaces in the first source code that call the application programming interface in the second source code comprises:
   the computer generating a trace for each application programming interface in the first source code; and
   the computer identifying the set of application programming interfaces in the first source code that call the application programming interface in the second source code based on the trace for each application programming interface in the first source code.

7. The method of claim 1, wherein the first source code is a first module and the second source code is one or more modules of a library of modules.

8. A data processing system for analyzing source code, the data processing system comprising:
   a processor unit, a memory, and a computer readable storage device;

first program code to identify a call in a first source code to an application programming interface in a second source code, wherein the first code comprises one or more program statements in an application source code and the second source code comprises one or more program statements in at least one of a library source code and an application source code;

second program code to determine whether a set of policies for calls to application programming interfaces includes a policy for calls to the application programming interface in response to identifying the call in the first source code to the application programming interface in the second source code, wherein the policy includes an identifier of the application programming interfaces for which the policy applies, an indicator and a type of malicious act which is performed when the indicator is set; and third program code to generate the policy for calls to the application programming interface identified and add the generated policy to the set of policies for calls to application programming interfaces in response to a determination that the set of policies for calls to application programming interfaces does not include the policy for calls to the application programming interface identified, wherein the first program code, the second program code, and the third program code are stored in the computer readable storage device for execution by the processor unit via the memory.

9. The data processing system of claim 8, further comprising:

third program code to generate a trace for the application programming interface in the second source code, the trace comprising actions that may be taken when the application programming interface identified is called; and fourth program code to analyze the trace for the application programming interface in the second source code to determine whether the application programming interface identified can be used to perform one or more types of malicious acts based on the whether the actions in the trace for the application programming interface identified include one or more actions that can perform the one or more types of malicious acts, wherein the third program code and the fourth program code are stored in the computer readable storage device for execution by the processor unit via the memory.

10. The data processing system of claim 9, further comprising:

fifth program code to modify the policy for calls to the application programming interface identified to indicate the type of malicious act that cannot be performed by calls to the application programming interface identified in response to a determination that the application programming interface identified cannot be used to perform a particular type of malicious act; and sixth program code to modify the policy for calls to the application programming interface identified to indicate the type of malicious act that can be performed by calls to the application programming interface identified in response to a determination that the application programming interface identified can be used to perform the particular type of malicious act, wherein the fifth program code and the sixth program code are stored in the computer readable storage device for execution by the processor unit via the memory.

11. The data processing system of claim 10, further comprising:

seventh program code to identify a set of application programming interfaces in the first source code that call the application programming interface in the second source code;

eighth program code to modify each policy for calls to each application programming interface in the set of application programming interfaces in the first source code that call the application programming interface in the second source code to indicate the type of malicious act that cannot be performed by calls to the application programming interface in the second source code in response to the determination that the application programming interface in the second source code cannot be used to perform the particular type of malicious act; and ninth program code to modify each policy for calls to each application programming interface in the set of application programming interfaces in the first source code that call the application programming interface in the second source code to indicate the type of malicious act that can be performed by calls to the application programming interface in the second source code in response to the determination that the application programming interface in the second source code can be used to perform the particular type of malicious act, wherein the seventh program code, the eighth program code, and ninth program code are stored in the computer readable storage device for execution by the processor unit via the memory.

12. The data processing system of claim 8, wherein the third program code to generate the policy for calls to the application programming interface identified comprises program code to use a default policy for identifying calls to newly identified application programming interfaces as calls to application programming interfaces that are potentially vulnerable to malicious attacks.

13. The data processing system of claim 11, wherein seventh program code to identify the set of application programming interfaces in the first source code that call the application programming interface in the second source code comprises:

program code to generate a trace for each application programming interface in the first source code; and program code to identify the set of application programming interfaces in the first source code that call the application programming interface in the second source code based on the trace for each application programming interface in the first source code.

14. The data processing system of claim 8, wherein the first source code is a first module and the second source code is one or more modules of a library of modules.

15. The method of claim 1, wherein the method for analyzing source code occurs within a data flow analysis environment.

16. A computer program product for analyzing source code, the computer program product comprising:

a computer readable storage device;

program code, stored on the computer readable storage device, for identifying a call in a first source code to an application programming interface in a second source code, wherein the first code comprises one or more program statements in an application source code and the second source code comprises one or more program statements in at least one of a library source code and an application source code;

program code, stored on the computer readable storage device, for determining whether a set of policies for calls to application programming interfaces includes a policy for calls to the application programming interface identified in response to identifying the call in the first source code to the application programming interface in the second source code, wherein the policy includes an identifier of the application programming interfaces for which the policy applies, an indicator and a type of malicious act which is performed when the indicator is set; and program code, stored on the computer readable storage device, for generating the policy for calls to the application programming interface identified and adding the generated policy to the set of policies for calls to application programming interfaces in response to a determination that the set of policies for calls to application programming interfaces does not include the policy for calls to the application programming interface identified.

17. The computer program product of claim 16, further comprising:

program code, stored on the computer readable storage device, for generating a trace for the application programming interface in the second source code, the trace comprising actions that may be taken when the application programming interface identified is called; and program code, stored on the computer readable storage device, for analyzing the trace for the application programming interface in the second source code to determine whether the application programming interface identified can be used to perform one or more types of malicious acts based on the whether the actions in the trace for the application programming interface identified include one or more actions that can perform the one or more types of malicious acts.

18. The computer program product of claim 17, further comprising:

program code, stored on the computer readable storage device, for modifying the policy for calls to the application programming interface identified to indicate the type of malicious act that cannot be performed by calls to the application programming interface identified in response to a determination that the application programming interface identified cannot be used to perform a particular type of malicious act; and program code, stored on the computer readable storage device, for modifying the policy for calls to the application programming interface identified to indicate the type of malicious act that can be performed by calls to the application programming interface identified in response to a determination that the application programming interface identified can be used to perform the particular type of malicious act.

19. The computer program product of claim 18, further comprising:

program code, stored on the computer readable storage device, for identifying a set of application programming interfaces in the first source code that call the application programming interface in the second source code;

program code, stored on the computer readable storage device, for modifying each policy for calls to each application programming interface in the set of application programming interfaces in the first source code that call the application programming interface in the second source code to indicate the type of malicious act that cannot be performed by calls to the application programming interface in the second source code in response to the determination that the application programming interface in the second source code cannot be used to perform the particular type of malicious act; and program code, stored on the computer readable storage device, for modifying each policy for calls to each application programming interface in the set of application programming interfaces in the first source code that call the application programming interface in the second source code to indicate the type of malicious act that can be performed by calls to the application programming interface in the second source code in response to the determination that the application programming interface in the second source code can be used to perform the particular type of malicious act.

20. The computer program product of claim 16, wherein the program code for generating the policy for calls to the application programming interface identified comprises program code for using a default policy for identifying calls to newly identified application programming interfaces as calls to application programming interfaces that are potentially vulnerable to malicious attacks.

21. The computer program product of claim 16, wherein the first source code is a first module and the second source code is one or more modules of a library of modules.

* * * * *